Jan. 14, 1958 R. A. PAETZ 2,819,732
VARIABLE AREA TURBINE ENTRANCE NOZZLE
Filed July 14, 1954 4 Sheets-Sheet 1
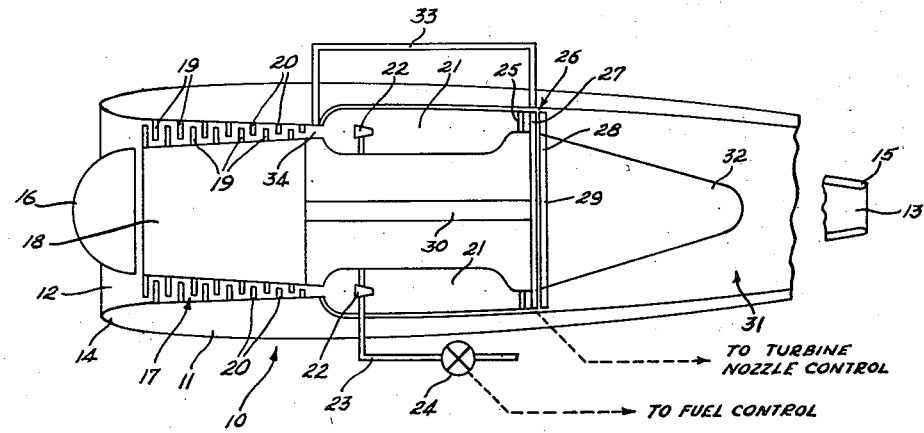
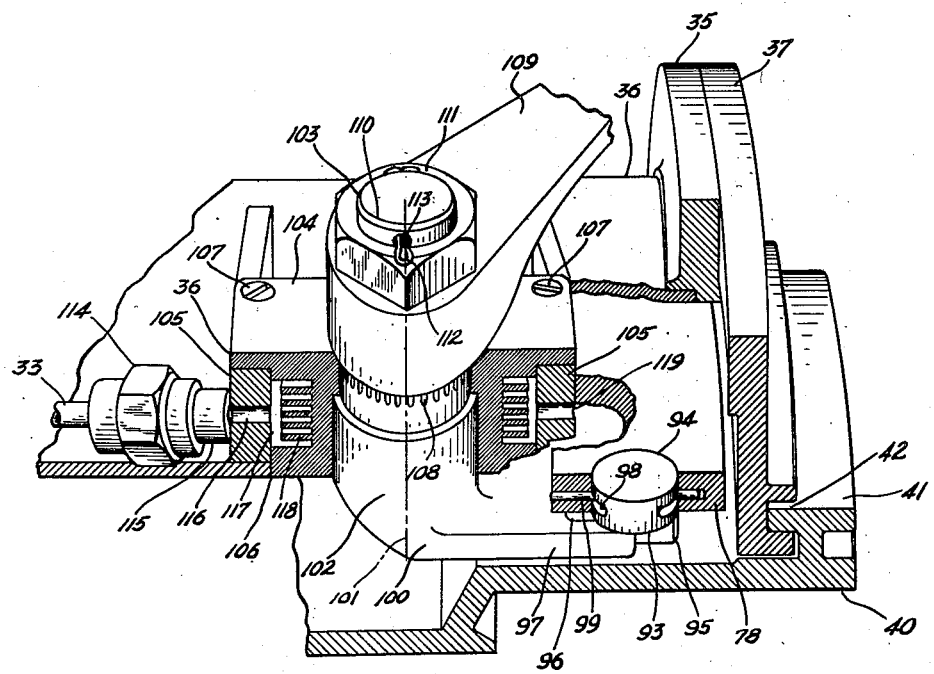
Inventor
Robert A. Paetz
by
Attys.

Inventor
Robert A. Paetz

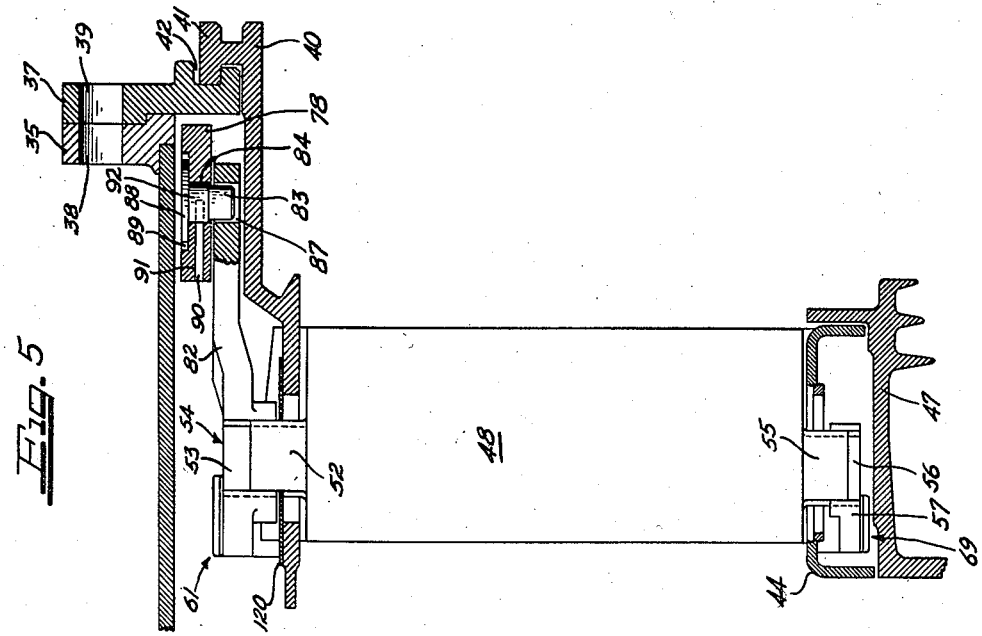
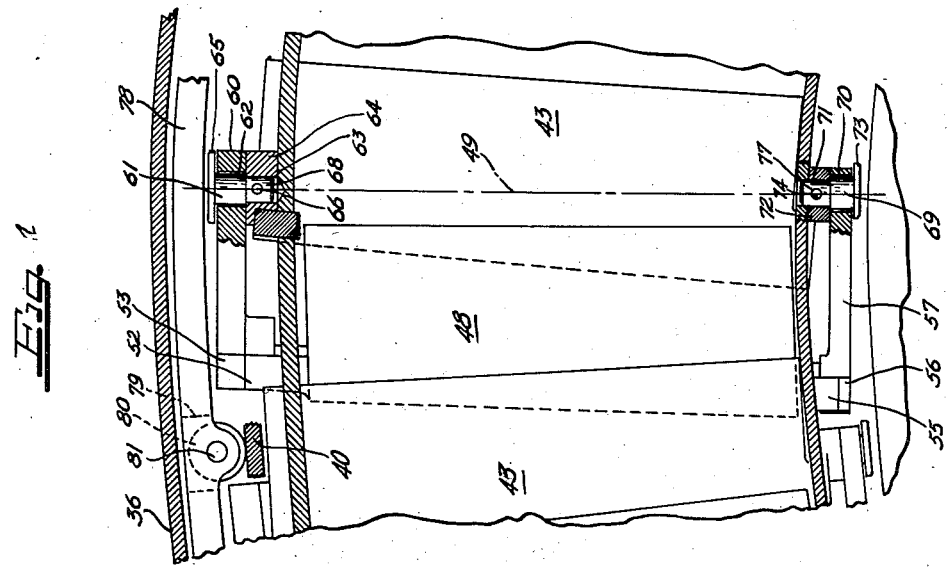

Jan. 14, 1958 R. A. PAETZ 2,819,732
VARIABLE AREA TURBINE ENTRANCE NOZZLE
Filed July 14, 1954 4 Sheets-Sheet 4
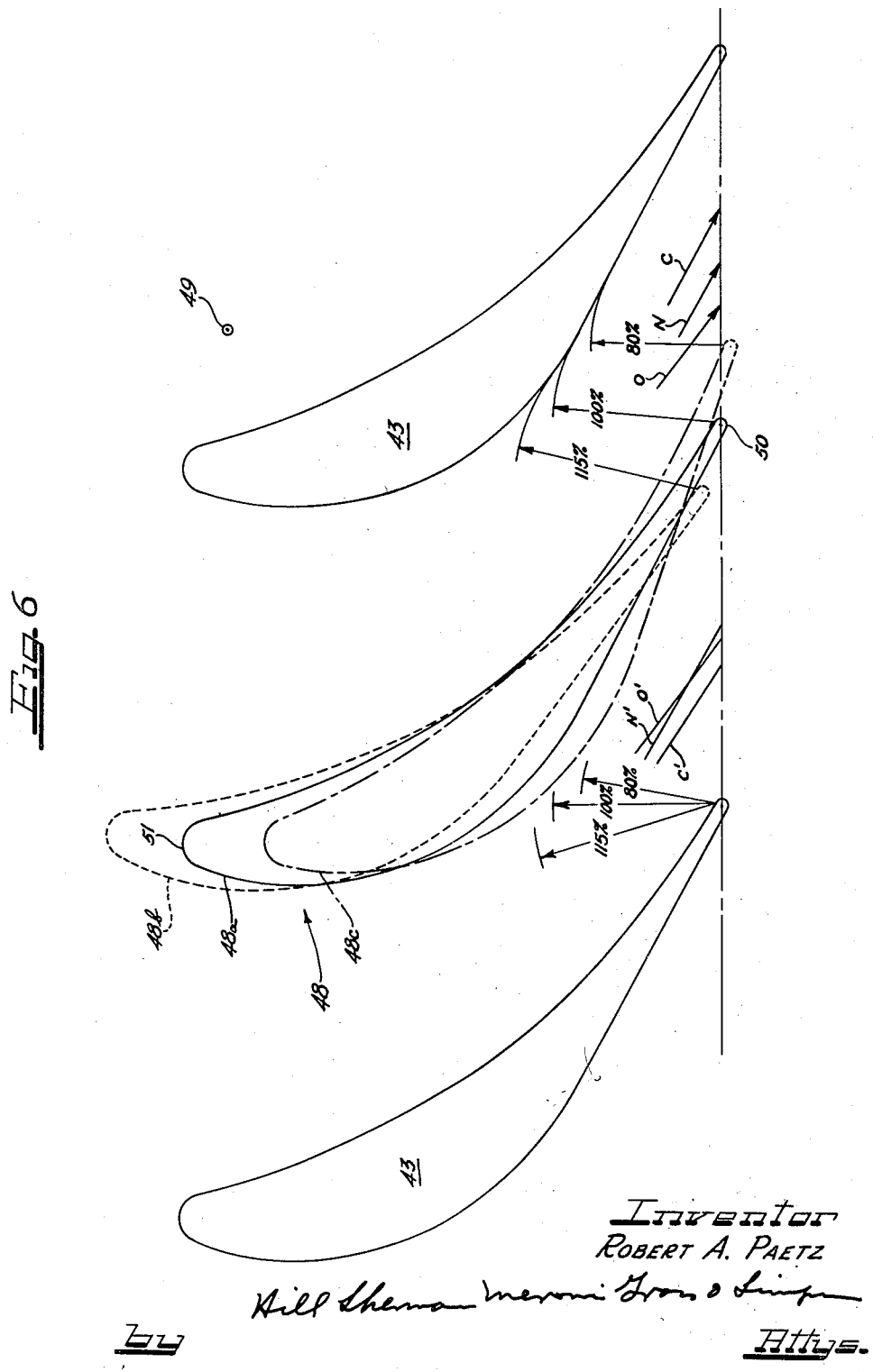
Inventor
ROBERT A. PAETZ

United States Patent Office 2,819,732
Patented Jan. 14, 1958

2,819,732

VARIABLE AREA TURBINE ENTRANCE NOZZLE

Robert A. Paetz, University Heights, Ohio, assignor to Thompson Products, Inc., Cleveland, Ohio, a corporation of Ohio Application July 14, 1954, Serial No. 443,343

11 Claims. (Cl. 138—46)

This invention relates to a turbine entrance nozzle, and more particularly the present invention relates to a turbine entrance nozzle being controllable to vary the area for fluid flow therethrough to the turbine to control the operating parameters of the turbine.

Still more particularly the present invention relates to a variable area turbine entrance nozzle which is particularly adaptable and has particular utility in a turbo-jet engine construction to control the flow of gases from the combustion cans or chambers to the turbine so that the engine can be operated at other than its designed operating parameters with increased component efficiency over an engine with a fixed turbine entrance nozzle.

Heretofore, many turbo-jet engines have been operated with fixed radial vanes in an annular arrangement to form the entrance guide and nozzle for the turbine. It has been found, however, that operating component efficiency and operating engine efficiency can be greatly improved by controlling the hot gas flow to the turbine to thereby control turbine speed and power.

Therefore, some turbo-jet engine turbine entrance nozzles have been constructed so that the vanes, etc. may be adjustable at preset conditions which are set prior to engine operation in accordance with the probable demands upon the engine during each operating experience thereof. This, of course, was found to be an improvement over the fixed nozzle condition but nevertheless did not achieve the desired results since the control could not be changed during engine operation and the efficiency was, therefore, not substantially increased.

In view of this, there have been various attempts to construct nozzles wherein the flow characteristics of the nozzle could be varied during operation of the engine or while the engine is running. These attempts were principally conducted along three lines of development, none of which produced the desired results or fully satisfied the desired ends.

The first general category or line of approach to satisfaction of this problem may be termed "The Venetian Blind Method." In this method of design, all of the vanes are pivotally arranged about axes generally passing through the vanes radially of the nozzle. With such a construction it is obvious that there is no structural continuity at the turbine entrance nozzle and therefore results in a physical and structural continuity is obviously highly undesirable and therefore resulted in dissatisfaction with "The Venetian Blind Method."

The second general category or line of development may be termed "The Annulus Variation Method." In this method the diameter of the inner and/or the outer ring of the turbine entrance nozzle is varied to obtain the desired variation in flow area of the nozzle. For this type of construction to operate properly, the construction limits of necessity require very close tolerances and the apparatus itself is operable only within very short limits. Further, this method permits only a decrease in the flow area from the normal flow area under normal conditions and with accepted engine design. Therefore, "The Annulus Variation Method," is limited to several undesirable features and is somewhat impractical.

The third category or approach to satisfaction of this problem may be termed "The Passage Blocking Method." In this method, certain of the passages are blocked to provide a reduction in flow area. Therefore, it should be readily observed that "The Passage Blocking Method" is rather impractical and will not provide for increasing the flow area above the normal flow area of the turbine entrance nozzle when it is so desired.

In accordance with the principles of the present invention, however, a turbine entrance nozzle may be constructed so that there is structural continuity, so that it may be remotely controlled, and so that it will be operable to increase or decrease the flow area of the nozzle above the normal flow area thereof as desired.

It is, therefore, an important object to the present invention to provide a new and improved turbine entrance nozzle. Another object of the present invention is to provide a turbine entrance nozzle wherein alternate vanes are pivotally movable to increase or decrease the flow area between the vanes while the remaining vanes are fixed to the inner and outer rings of the nozzle thereby providing structural continuity to the nozzle.

Still another object of the present invention is to provide a new and improved turbine entrance nozzle wherein the nozzle flow area may be remotely controlled to vary the area from about 115% to about 80% of the normal flow area of the nozzle.

Still another object of the present invention is to provide a new and improved turbine entrance nozzle to control fluid flow therethrough to the turbine and wherein alternate radial vanes are pivotally movable and pivotally coupled to a control ring in such a manner that the ring may be operated through substantially pure circumferential movement.

Still another object of the present invention is to provide a new and improved turbine entrance nozzle wherein a plurality of radial vanes between a pair of rings are alternately movable and fixed to the rings, respectively, and means is provided to control the movement of the movable vanes in such a manner that the leading edge thereof will move axially of the nozzle at a substantially greater rate than the movement of the trailing edge of the movable vanes axially of the nozzle whereby the spacing of the entrance nozzle from the turbine may be maintained within desirable close limits.

Still other objects, features and advantages of the present invention will become readily apparent to those skilled in the art and others, from the following detailed description of the present invention and an embodiment thereof, from the claims, and from the drawings, in which each and every detail shown is fully and completely disclosed as a part of this specification, in which like reference numerals refer to like parts, and in which:

Figure 1 is a schematic and diagrammatic view of a turbo-jet engine having an entrance nozzle therein embodying the principles of the present invention;

Figure 3 is a fragmental perspective view of still another part of the turbine entrance nozzle and control mechanism therefor shown with certain parts thereof broken away and certain other parts thereof in section to better illustrate the same;

Figure 4 is a fragmental transverse vertical sectional view of a part of the turbine entrance nozzle to show certain details of the vane mounting and construction thereof;

Figure 5 is a fragmental vertical sectional view of the turbine entrance nozzle; and Figure 6 is a more or less diagrammatic view of a movable vane and a pair of fixed vanes to show the operating characteristics of the turbine entrance nozzle of this invention and the extent of control thereof for controlling fluid flow to the turbine.

As shown on the drawings:

Figure 2:
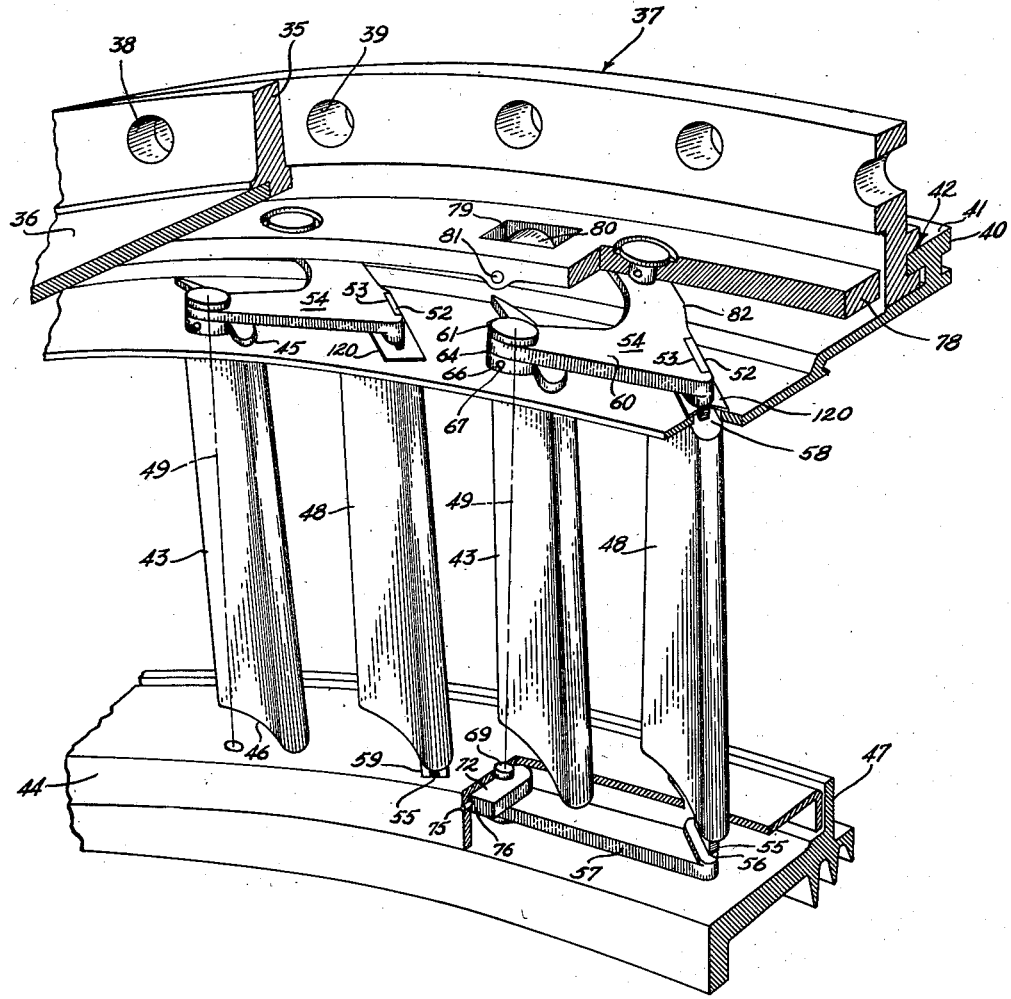
Figure 2 is a fragmental perspective view of an entrance nozzle embodying the principles of the present invention and shown with certain parts thereof broken away and certain other parts thereof in section to better illustrate the same.

There is schematically illustrated in Figure 1 a turbojet type of engine mechanism 10 having a housing or casing 11 of substantially teardrop external configuration. The housing 11 is axially hollowed with an enlarged air entrance at its forward or front end 12, thereafter tapering to an exhaust nozzle-like rear end 13. Both the front or intake end 12 and the exhaust or rear end 13 of the housing 11 have substantially smooth curved edges 14 and 15, respectively.

A nose bell 16, of substantially semi-spherical configuration is positioned coaxially within the housing 11, preferably so that it is intersected by the plane of the leading edge 14, at the intake end 12 of the engine 10. The intake end 12 preferably has a slightly flared mouth configuration internally of the housing 11, and together with the semi-spherical configuration of the nose bell 16 gathers inlet air and directs the air into a rotary compressor 17. The rotary compressor 17 has a substantially frusto-conical rotor body 18 carrying a plurality of rows or rings of airfoil contoured blades or buckets or vanes 19 or the like of diminishing length respectively from front to rear along the compressor rotor body 18. Successive rows or rings of rotor compressor blades 19 are circumferentially disposed about the compressor rotor body 18 and spaced for angular or rotary movement between successive rings or rows of compressor stator blades 20, fixed to the housing 11 or to a compressor stator ring or the like which is in turn secured to the housing 11. The stator compressor blades 20 are also of diminishing length progressively rearwardly from the inlet to the compressor and direct the increasingly compressed air stream from one row or circumferential ring of rotor blades 19 to the next row or circumferential ring thereof in the most efficient manner. High pressure and high temperature compressed air from the compressor 17 leaves the compressor 17 to enter a plurality of combustion cans 21 forming a combustion chamber wherein fuel is supplied from main combustion fuel ejection nozzles 22—22 of any particular desired design not critical to the present invention. The fuel may be supplied to the combustion nozzles 22 in any particular desired manner which herein is illustrated merely as a fuel line 23 having a control valve 24 therein operatively connected to a fuel control mechanism (not shown). The fuel line 23, of course, is connected to the fuel tank or tanks (not shown).

Within the combustion cans 21 of the combustion chamber, the fuel from the nozzle 22 is ignited in high pressure air from the compressor 18 and this ignition of the gas still further increases the pressure within the cans and particularly at the outlet 25 thereof. Still more importantly, however, the combustion reactions within the cans or combustion chambers are such as to provide the turbo-jet engine with tremendous thrust forces which will be sufficiently high to drive such vehicles as aircraft, land or water vehicles, etc., at very high rates of speed.

The exhaust gases from the combustion cans 21 of the main combustion chamber are exhausted from the cans through the outlet ports 25 from the cans or combustion chamber exhaust nozzles and are directed against a "turbine diaphragm" 26 comprised of airfoil turbine blades or buckets or vanes or the like fixed to the housing 11 to form a turbine entrance nozzle or stator nozzle 27 which directs the exhaust gases and fluids against a ring or row of turbine rotor blades or buckets or vanes 28 which are rotatably or angularly driven thereby. The turbine rotor blades 28 are fixed to a turbine rotor 29 which is drivingly connected to the rotor body or shaft 30, coaxially supported by appropriate bearings or the like (not shown) within the housing 11 for driving the compressor rotor 18 which is also fixed to the shaft 30.

Following the turbine stage, the exhaust fluids and fumes and flames enter the exhaust chamber, indicated generally at 31, having a generally toroidal configuration limited or walled by the substantially conical interior of the housing 11 as the external surface of the exhaust chamber in this area, and by a nozzle cone or the like 32 as the interior surface of this toroidal exhaust nozzle chamber. Further, beyond the exhaust chamber and rearwardly thereof, the fumes and gases are exhausted through the outlet nozzle 13 at the trailing edge 15 of the housing 11.

As further schematically illustrated in Figure 1, a cooling air supply line 33 is so connected in the engine system as to bleed air from the rearward end of the compressor, as at 34, and feed the same to certain parts of the turbine entrance nozzle 27 so as to cool the same substantially below the temperature of the hot exhaust gases from the combustion chamber 21, as will be further described in much greater detail hereinbelow.

As pointed out hereinabove, the engine can be operated with substantially greater component efficiency and with substantially greater over-all efficiency by controlling the rate and direction of fluid flow through the nozzle 27 of the diaphragm 26 to the turbine 29. An embodiment of the present invention and comprising a mechanism operable to so control the fluid exhaust from the combustion chamber is illustrated in great detail in Figures 2, 3, 4 and 5, wherein the various views illustrate the construction details of the turbine entrance nozzle.

The turbine entrance nozzle itself, as illustrated in Figures 2, 4 and 5 includes the burner support ring 35 which may be fixed to the housing 11 (not shown in these Figures) and which carries the combustion chamber cam supporting plate 36 forwardly thereof and which further supports and carries a mounting ring 37. Appropriate apertures 38 and 39 in the burner support ring 35 and the mounting ring 37, respectively, permit securing the same together and to the interior of the housing 11 by any appropriate supporting means such as rivets or bolts or the like. The outer ring 40 of the nozzle diaphragm is mounted on the mounting ring 37 and may have a radially outwardly extending T-shaped portion 41 which will interfit as by a tongue and groove mounting connection, indicated generally at 42, in a recess between a pair of tongues on the rearward face and on the radially inner portion of the mounting ring 37. This tongue and groove mounting connection 42 between the nozzle outer ring 40 and the mounting ring 37 also aids in providing an effective seal therebetween against the escape of gases externally of the nozzle.

Axially forwardly from the mounting ring 37, there is secured to the annular inner face of the outer ring 40, a plurality of fixed airfoil contoured vanes 43—43 which are arranged to form a vaned annulus and each extends radially inwardly from the outer ring 40 to the inner ring 44 to which the radially inner ends of the vanes 43 are secured. These fixed vanes 43 may be secured to the inner and outer rings 40 and 44 in any desired manner and herein are shown as being fixed thereto by extending through appropriately configurated radial apertures 45 and 46, respectively, in the outer and inner rings 40 and 44. It should also be noted that the inner ring 44 has a substantially annular channel-shaped radially inwardly opening construction and may be secured to and carry a labyrinth seal 47 which will cooperate with the turbo-jet engine rotor to prevent the leak and escape of gases and exhaust fluids between the nozzle and the engine rotor. By means of this seal and the seal at 42 all of the exhaust gases from the combustion chamber will be directed to the nozzle.

The nozzle fixed vanes 43 are set at an appropriate angle and have a proper contour for directing the fluid from the combustion chamber and the combustion chamber exhaust nozzles to the turbine in a proper direction to drive the turbine and the rotor blades 29 thereof at a proper operating speed for normal operating conditions of the engine and the components thereof so that the engine will operate at maximum efficiency and have maximum component efficiency under its normal operating conditions.

Movable vanes 48 are arranged alternately with the fixed vanes 43 and have a substantially similar or identical airfoil configuration and are arranged at the same angle with respect to an axial plane, as the fixed blades 43 under normal operating conditions so that they, too, will properly direct the exhaust gases for maximum efficiency under normal operating conditions of the engine.

The movable vanes 48 have a radial dimension substantially the same as the radial distance between the inner ring 44 and the outer ring 40 but are dimensioned smaller than the space between those rings by tolerances which permit movement of the movable vanes between the rings.

As will be more fully described in detail hereinbelow the movable vanes 48—48 are respectively arranged to be pivotally moved about substantially radial axes 49—49 respectively.

The pattern of movable vane pivotal movement and the control afforded thereby is illustrated in Figure 6 wherein there is diagrammatically shown a pair of fixed vanes 43 with a movable vane 48 therebetween. The movable vane 48 has been shown in three positions 48a, 48b and 48c to indicate the normal, the open and the closed positions to which the movable vane is pivotable for opening and closing of the nozzle and increasing and decreasing of the flow area therethrough, respectively.

The movable vane 48 is arranged to pivot about the axis 49 in such a manner that when it is pivoted to its rearward position 48c the flow area will be substantially reduced, while when the vane 48 is pivoted to its forward position 48b the flow area will be substantially increased over the normal flow area between the vanes such as when the vane 48 is in the normal operating position 48a. In the diagram of Figure 6 the vane 48 has been shown as movable between positions of minimum flow area of about 80% of normal flow area and maximum flow area of about 115% of normal flow area. These flow areas are indicated by arcs and radius arrows which are identified by the numerals 80%, 100% and 115% which indicate the minimum flow area, the normal flow area and the maximum flow area, respectively. These flow areas are measured herein between the trailing edge of the movable vane 48 and normal points on the adjacent fixed vane 43 on one side of the movable vane 48, and between the trailing edge of the fixed vane 43 and the normal points on the movable vane 48 on the other side of the movable vane 48.

It will also be noted in this connection that in addition to changing the flow area by moving the movable vane 48 as by pivoting the same about the axis 49, the direction of fluid flow outwardly from the trailing edges of the vanes will be varied as indicated by the direction arrows C, N and O on one side of the movable vane 48 and C¹, N¹ and O¹ on the other side of the movable vane 48, so that movement of the movable vane in addition to changing the flow area for changing operating parameters in various conditions of operation of the engine and the turbine will also change the angle of exhaust gas flow to the turbine for more efficient operation of the engine and better component efficiency thereof.

As will be noted in Figure 1, the turbine entrance nozzle and the turbine are very closely axially positioned, with the turbine disposed immediately adjacent and rearwardly from the entrance nozzle. This closeness is preferred in order to most efficiently drive the turbine and most efficiently direct the exhaust gases thereto. In order to permit this closeness of positioning of the turbine entrance nozzle and the turbine rotor and still have pivotally movable vanes in accordance with the principles of the present invention, the present invention contemplates so pivotally moving the movable vane 48 that the trailing edge 50 thereof has very little axial displacement and so that most of the axial displacement is at the leading edge 51 of the movable vane 48. As will be seen in Figure 6 by selecting the pivot center line 49 so that it is parallel to the radial center line of the movable vane 48 and properly positioned, the movement of the leading edges 51 of the vanes 48 will be about five times as great as the movement of the trailing edges 50 of the movable vane 48 in an axial direction when the vane is moved from its limited position in one direction to its limited position in the other direction, such as from its maximum open position to its maximum closed position.

In accordance with these principles, the leading edge will move axially at a rate of about 100 to 1 of the movement of the trailing edge axially when moving the movable vane to its closed position from its maximum open position at initiation of the movement and at a rate of about 100 to 1 at termination of the movement in the region of the maximum closed position.

Thus it will be observed that proper selection of the center line axis of movement of the radial vane 48 will permit a wide range of movement of the vane 48, a wide range of opening and closing of the flow area between the vanes, and will further permit such movement of the movable vane 48 that the trailing edge 50 thereof will have only slight movement axially of the nozzle, thereby permitting the nozzle to be very closely spaced to the turbine to more efficiently direct the exhaust gases from the combustion chamber thereagainst.

The manner of pivotally mounting the movable vanes 48 so that they will rotate about their respective axes 49 which are parallel to the radial center lines of the movable vanes 48 is illustrated in Figures 2, 4 and 5, wherein it is shown that each of the movable vanes 48 has an upper radial tongue or projection 52 which is secured in an appropriate recess 53 in the region of the center portion of a double-armed or bell crank type lever member 54. The radially inner ends of the movable vanes 48 also have tongues or projections 55 which are secured in an appropriate recess 56 in the free end of a pivoted lever or bar 57. The outer and inner tongues 52 and 55 extend radially outwardly and inwardly, respectively, through appropriate slots 58 and 59 respectively in the outer and inner rings 40 and 44. These slots 58 and 59 are sufficiently elongated and appropriately configurated to permit movement of the vane 48 as hereinabove described in conjunction with the diagrammatic illustration of Figure 6.

For pivoting the movable vanes 48, the outer lever 54 has the end of one arm 60 thereof pivoted on a pivot pin 61 which extends through an aperture 62 in the arm 60 and into a recess 63 in a pivot block 64 which is appropriately affixed to the peripheral outer face of the outer ring 40. The pivot pin 61 has a cap-like head 65 to retain the arm 60 of the lever 54 in place. The pivot pin 61 is also affixed onto the outer ring 40 and in the pivot block 64 by a pin 66 which extends through an aperture 67 in the pivot block 64 and an aperture 68 in the pivot pin 61.

At the radially inner side of the nozzle assembly the pivot arm 57 has its other end pivotally arranged on a pivot pin 69 which extends through an appropriate aperture 70 in the pivoted end of the arm 57 and through an aperture 71 in a lower pivot block 72 which is secured to the peripheral inner face of the inner ring 44 and in the channel therein. The pivot pin 69 has a cap-like head 73 to retain the arm 57 in place and is secured to the pivot block 72 by a pin 74 which extends through an aperture 75 in the inner ring 44, an aperture 76 in the pivot block 72, and an aperture 77 (Figure 4) in the pivot pin 69.

It will be noted that the center line of the pivot pins 61 and 69 provides the center line of rotation and pivotal movement of the movable vanes 48. This axis of rotation is preferably parallel to the radial axes of the movable vanes 48, respectively, whereby the radial vanes 48 will substantially maintain a radial position in all positions thereof as the movable vanes are pivoted to increase or decrease the flow area of the nozzle.

The selection of the position of the axes 49 for the movable vanes 48 is also important from another control aspect for movement of the movable vanes 48. This aspect includes the manner of mounting control mechanism for moving the vanes 48 pivotally about the axes 49.

For a control mechanism to move the vanes 48 pivotally about the axes 49 there is provided a control ring or bar 78 which is positioned annularly and radially outwardly of the outer ring 40 but spaced radially inwardly from the burner mounting plate 36 and the burner support 35 and axially adjacent to the mounting ring 37 and forwardly thereof. This control ring 78 is adapted to roll annularly or angularly about the peripheral outer surface of the outer ring 40 by having radial apertures 79 therein in which there is rotatably mounted axially extending rollers 80 journaled on pins 81 extending axially through the control bar or ring 78 and the rollers 80. The control ring 78 is also pivotally coupled to the other arm 82 of the double-armed lever 54 by means of a pivot pin 83 (Figure 5) which extends through a radial aperture 84 in the control ring 78 and through a radial aperture 85 in the end of the arm 82 of the bell crank type lever 54. The pivot pin 83 has a cap-like head 88 seated in an appropriate enlarging recess 89 in the outer surface of the control ring 78 and is pinned to the control ring 78 by a pin 90 extending axially through an aperture 91 in the control ring 78 and an aperture recess 92 in the shank of the pivot pin 83.

This arrangement, together with the proper selection of the axes 49 about which the pivotally arranged vanes 48 are moved, permits the control ring 78 to move in substantially pure rotational movement about the axis and without any displacement axially of the nozzle.

Mechanism for moving the control bar or ring longitudinally or circumferentially is illustrated in Figure 3 where it may be seen that the control ring 78 is controllably rotated angularly by forces applied to a control pin 93 which is mounted in the control ring 78 for limited rotational movement. By moving the control ring 78, through action on the control pin 93, in, for example, a clockwise direction as viewed in Figure 2, the movable vanes 48 will be moved in a forward direction to increase the flow area through the nozzle as explained hereinabove in connection with Figure 6, while moving the control ring 78 in a counter-clockwise direction as the same as viewed in Figure 2 will operate to move the pivotal vanes 48 rearwardly to decrease the flow area of the nozzle.

Returning now to the details of the construction of the movement control mechanism, the control pin 93 is pivotally positioned in an aperture 94 in the control ring 78 and has a radially inwardly extending tongue or tab 95 which engages a slot 96 in a control arm 97. The control pin 94 has an X type aperture 98 extending therethrough to limit pivotal movement in the recess 94 of the control ring 78 through cooperation with a pin 99 which extends through the recess 98 to engage the angularly positioned walls thereof to limit rotation of the pin and thereby limit rotation of the control ring 78.

The action of the tab 95 in the slot 96 of the control arm 97 is on the principle of a cross head and guide, since the control arm 97 forms a part of a bracket 100 which is rotatable about an axis 101 and which has a hub 102 that is fixed on a shaft 103 for rotation therewith, the shaft 103 extending radially outwardly from the hub 102.

Thus, by rotation of the lever arm or control arm 97 in one direction the control ring 78 will be rotated in one direction and the control pin 93 will be rotated in one direction, limited by cooperation of the pin 99 and the slot 98 in the pin 93 while the tab 95 on the control pin 93 will slide in the slot 96 of the control arm 97. Reverse movement will reverse these actions.

To rotate the arm 97 of the control member 100, the shaft 103 secured in the hub 102 is journaled in a bushing block 104 which is mounted on a mounting block 105 which is fixed on the burner support plate 36 about an aperture 106 therein. The bushing block is secured to the mounting block 105 by such means as screws 107 or the like.

Radially outwardly from the bushing block 104, the shaft 103 is splined as at 108 to carry such means as a lever 109 for rotation therewith. The lever 109 may form a part of a remote control system whereby the movable vanes 48 may be rotated and pivoted through rotation of the shaft stub 103.

Further radially outwardly from the splined region 108 of the shaft 103 the shaft is threaded as at 110 to carry a nut 111 to retain the lever 109 in place on the splined region 108. Any convenient means such as a cotter pin 112 extending through an aperture 113 in the threaded region of the shaft 103 will retain the nut 111 in place on the shaft 103.

Since the gases entering into the region of the nozzle from the combustion chamber are extremely hot it is highly desirable to keep the bushing 104 cool so as not to bind the shaft 103 and the hub 102 of the control member 100 and so as to permit efficient rotational control for the pivoted alternate vanes 48. Such cooling is provided by bleeding compressed air from the rearward end of the compressor and shooting the same through a line 33 mounted by a nut 114 into a fitting 115 through an appropriate aperture 116 in the bushing mounting block 105. This cooler high pressure air then circulates around the bushing 104 in a passage 117 provided within the bushing block 105 by recessed cooling fins 118 on the bushing 104. The cooling air passes through this passage 117 thus cooling the bushing by engagement with the cooling fins 118 and then passes outwardly from the bushing mounting block 105 through a passage or aperture 119 therein on the opposite side of the block from the entrance aperture 116.

In conjunction with the control of gas flow and air flow, it should be noted that since the air pressure and fluid pressure between the outer ring 40 and the burner mounting ring or plate 36 is higher than that of the fluids or gases passing between the vanes 43 and 48, plates or seals 120 are fixed on the radially outer tabs 52 of the movable vanes 48 to cover and seal the apertures 58 in the outer ring 40.

From the foregoing it will be observed that by the principles of the present invention there is provided a new and improved turbine entrance nozzle operable to control fluid flow therethrough to the turbine. It will also be observed that numerous variations and modifications may be made without departing from the true spirit and scope of the principles and concepts of the present invention.

I, therefore, intend to cover all such modifications and variations as fall within the true spirit and scope of the principles and concepts of this invention.

I claim as my invention:

1. In a turbine entrance nozzle to control the flow of fluid to a turbine, a pair of radially spaced coaxial rings, a first plurality of spaced fluid directing fixed vanes radially disposed between said rings and secured to both of said rings in firm assembly therewith, a second equal plurality of movable fluid directing vanes disposed between said rings and alternately between the vanes of said first plurality thereof and shiftable pivotally and axially to control fluid flow between alternate movable vanes and fixed vanes, a third ring coaxially mounted with said pair of rings, and means coupling said third ring to said vanes whereby controlled rotation of said third ring is operative to controllably move said pivotal vanes to control fluid flow between said movable vanes and said fixed vanes.

2. In a turbine entrance nozzle to control fluid flow therethrough, alternately arranged movable and fixed vanes and means pivotally mounting the movable vanes about axes outside the cross sectional perimeter of the vanes to vary the spacing between the movable vanes and the fixed vanes.

3. In a turbine entrance nozzle to control fluid flow therethrough, a ring, alternate radial movable and fixed vanes arranged peripherally about the ring and having leading and trailing edges, and means pivotally mounting the movable vanes about axes outside the cross sectional perimeter of the vanes to vary the spacing between the vanes.

4. In a turbine entrance nozzle to control fluid flow therethrough, a ring, alternate radial movable and fixed vanes arranged peripherally about the ring and having leading and trailing edges, and means pivotally mounting the movable vanes about axes outside the cross sectional perimeter of the vanes to vary the spacing between the vanes, the locus of movement of the movable vanes about said axes being such as to vary the spacing of the vanes through a range of from about 80% to about 115% of the normal spacing between the vanes.

5. In a turbine entrance nozzle to control fluid flow therethrough, a ring, alternate radial movable and fixed vanes arranged peripherally about the ring and having leading and trailing edges, and means pivotally mounting the movable vanes about axes outside the cross sectional perimeter of the vanes to vary the spacing between the vanes, the locus of movement of the movable vanes about said pivotal means being such that the leading edges are movable at a rate ranging from about 1 to about 100 times the rate of movement of the trailing edges axially of the nozzle.

6. In a turbine entrance nozzle to control fluid flow therethrough, a ring, alternate radial movable and fixed vanes arranged peripherally about the ring and having leading and trailing edges, and means pivotally mounting the movable vanes about axes outside the cross sectional perimeter of the vanes to vary the spacing between the vanes, the locus of movement of the movable vanes about said axes being such as to vary the spacing of the vanes through a range of from about 80% to about 115% of the normal spacing between the vanes, the leading edge of the movable vane being moved a distance axially of the nozzle about 5 times the distance of axial movement of the trailing edges when the spacing between the vanes is varied from maximum to minimum.

7. A turbine diaphragm nozzle comprising a pair of coaxial, radially spaced rings including an inner ring and an outer ring, a plurality of fixed vanes secured to said rings and extending radially therebetween, a plurality of movable vanes extending radially between said rings and alternately arranged with said fixed vanes, means pivotally securing said movable vanes to said rings for pivotal movement of said movable vanes respectively about axes outside the cross sectional perimeter of the vanes substantially parallel to the radial center lines of the movable vanes, and means to control movement of said movable vanes to control fluid flow between said vanes and through said nozzle by controllably varying the spacing between said movable vanes and said fixed vanes.

8. A turbine diaphragm nozzle comprising a pair of coaxial, radially spaced rings including an inner ring and an outer ring, a plurality of fixed vanes secured to said rings and extending radially therebetween, a plurality of movable vanes extending radially between said rings and alternately arranged with said fixed vanes, radial tongues on said movable vanes extending through elongated apertures in the inner and outer rings respectively, inner and outer lever members pivotally secured to the inner and outer sides respectively of the inner and outer rings and secured to tongues on the movable vanes to pivotally carry the movable vanes, a control ring disposed for rotational movement on the outer side of the outer ring, and means pivotally connecting the outer lever members to the control ring whereby rotational movement of the control ring will controllably pivot the movable vanes to control fluid flow between the several vanes of the nozzle.

9. A turbine diaphragm nozzle comprising a pair of coaxial, radially spaced rings including an inner ring and an outer ring, a plurality of fixed vanes secured to said rings and extending radially therebetween, a plurality of movable vanes extending radially between said rings and alternately arranged with said fixed vanes, radial tongues on said movable vanes extending through elongated apertures in the inner and outer rings respectively, inner and outer lever members pivotally secured to the inner and outer sides respectively of the inner and outer rings and secured to tongues on the movable vanes to pivotally carry the movable vanes, a control ring disposed for rotational movement on the outer side of the outer ring, means pivotally connecting the outer lever members to the control ring, a control shaft, a control lever pivotally coupled to the control ring and fixed on said shaft for rotation therewith, means to limit movement of said lever and said control ring, and means to rotate said shaft, said control lever transmitting movement to said control ring.

10. A turbine diaphragm nozzle comprising a pair of coaxial, radially spaced rings including an inner ring and an outer ring, a plurality of fixed vanes secured to said rings and extending radially therebetween, a plurality of movable vanes extending radially between said rings and alternately arranged with said fixed vanes, radial tongues on said movable vanes extending through elongated apertures in the inner and outer rings respectively, inner and outer lever members pivotally secured to the inner and outer sides respectively of the inner and outer rings and secured to tongues on the movable vanes to pivotally carry the movable vanes, a control ring disposed for rotational movement on the outer side of the ring, and means pivotally connecting the outer lever members to the control ring whereby rotational movement of the control ring will controllably pivot the movable vanes to control fluid flow between the several vanes of the nozzle the pivot points for the lever members on the inner and outer rings being selected to define axes of rotation substantially parallel to the radial center lines of the movable vanes respectively.

11. A turbine diaphragm nozzle comprising a pair of coaxial, radially spaced rings including an inner ring and an outer ring, a plurality of fixed vanes secured to said rings and extending radially therebetween, a plurality of movable vanes extending radially between said rings and alternately arranged with said fixed vanes, radial tongues on said movable vanes extending through elongated apertures in the inner and outer rings respectively, inner and outer lever members pivotally secured to the inner and outer sides respectively of the inner and outer rings and secured to tongues on the movable vanes to pivotally carry the movable vanes, a control ring disposed for rotational movement on the outer side of the outer ring, and means pivotally connecting the outer lever members to the control ring whereby rotational movement of the control ring will controllably pivot the movable vanes to control fluid flow between the several vanes of the nozzle, the pivot points for the lever members being positioned so that substantially pure rotational movement of said control ring substantially without axial movement thereof will pivot said movable vanes.

References Cited in the file of this patent

UNITED STATES PATENTS

| | | |
|---|---|---|
| 2,388,208 | Foss | Oct. 30, 1945 |
| 2,637,984 | Bloomberg | May 12, 1953 |